C. F. SALTER.
KNOCKDOWN MOUNTED DUMPING GRATE.
APPLICATION FILED MAY 28, 1908.
929,713.
Patented Aug. 3, 1909.
3 SHEETS—SHEET 2.
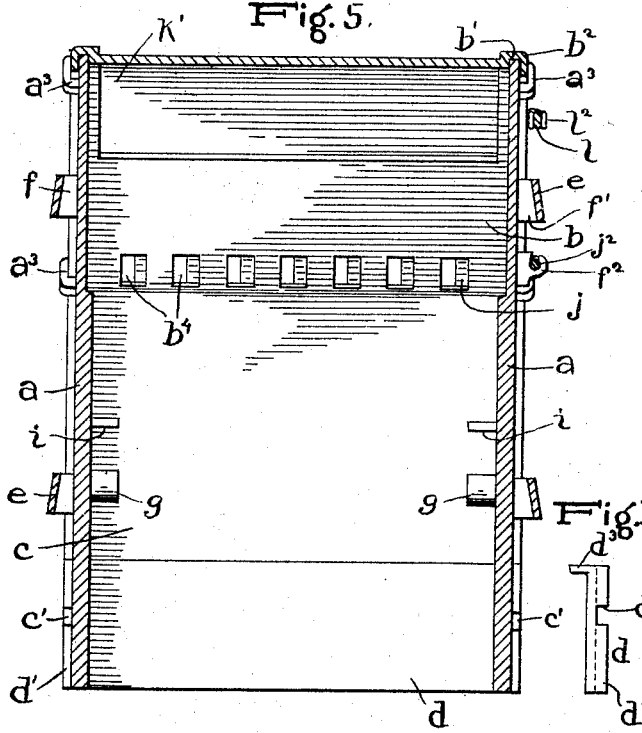
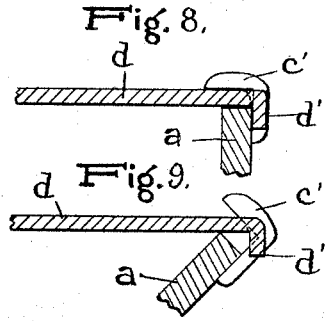
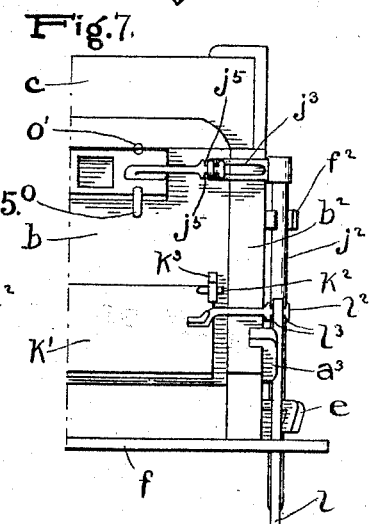
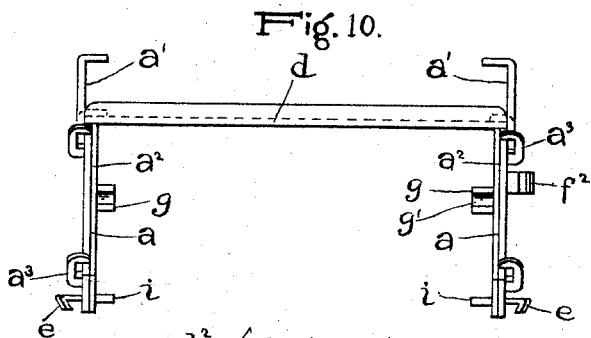
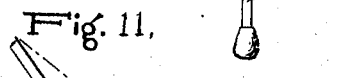
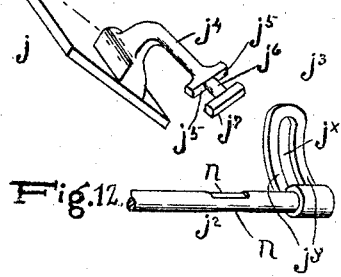
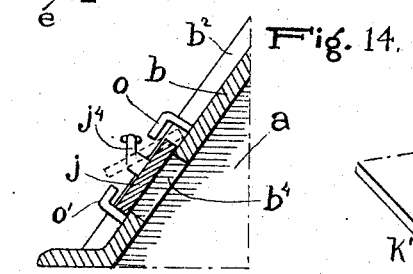
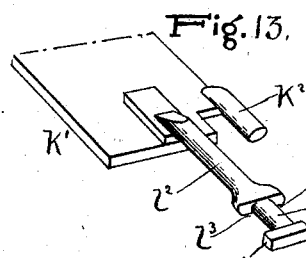
Witnesses
Stuart Hilder.
George M. Anderson.
Inventor
Charles F. Salter
By E. W. Anderson
his Attorney C. F. SALTER.
KNOCKDOWN MOUNTED DUMPING GRATE.
APPLICATION FILED MAY 28, 1908.
929,713.
Patented Aug. 3, 1909.
3 SHEETS—SHEET 3.
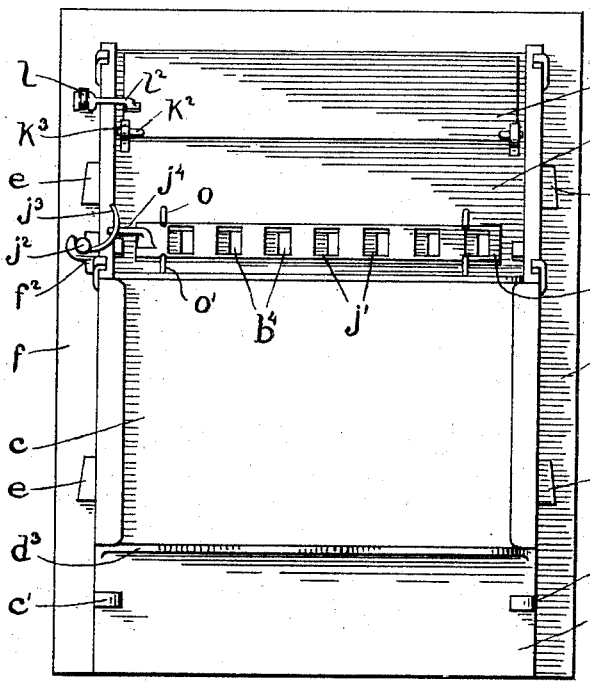
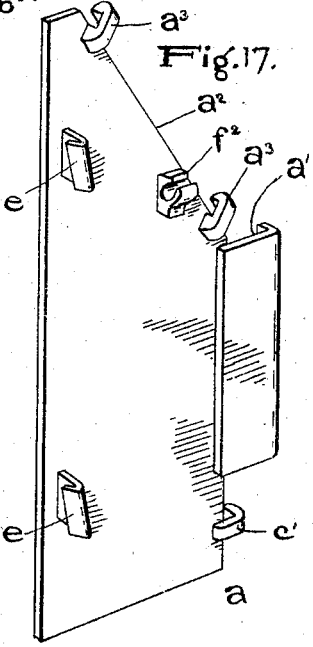
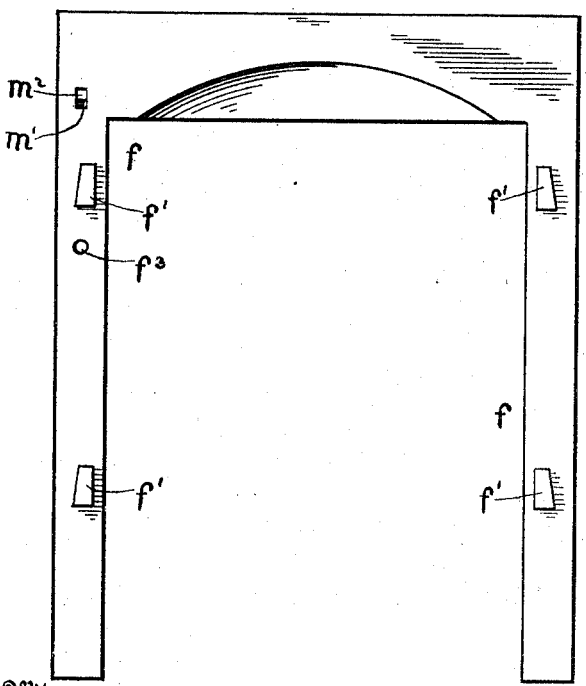
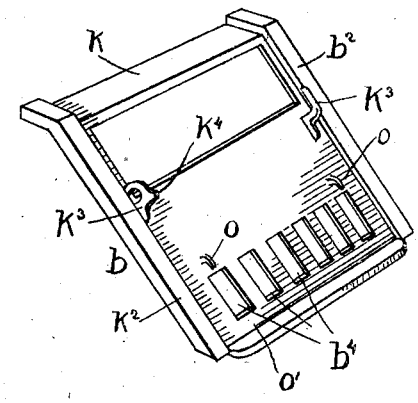
Witnesses
Stuart Hilder.
George M. Anderson.
Inventor
Charles F. Salter
By E. W. Anderson
his Attorney

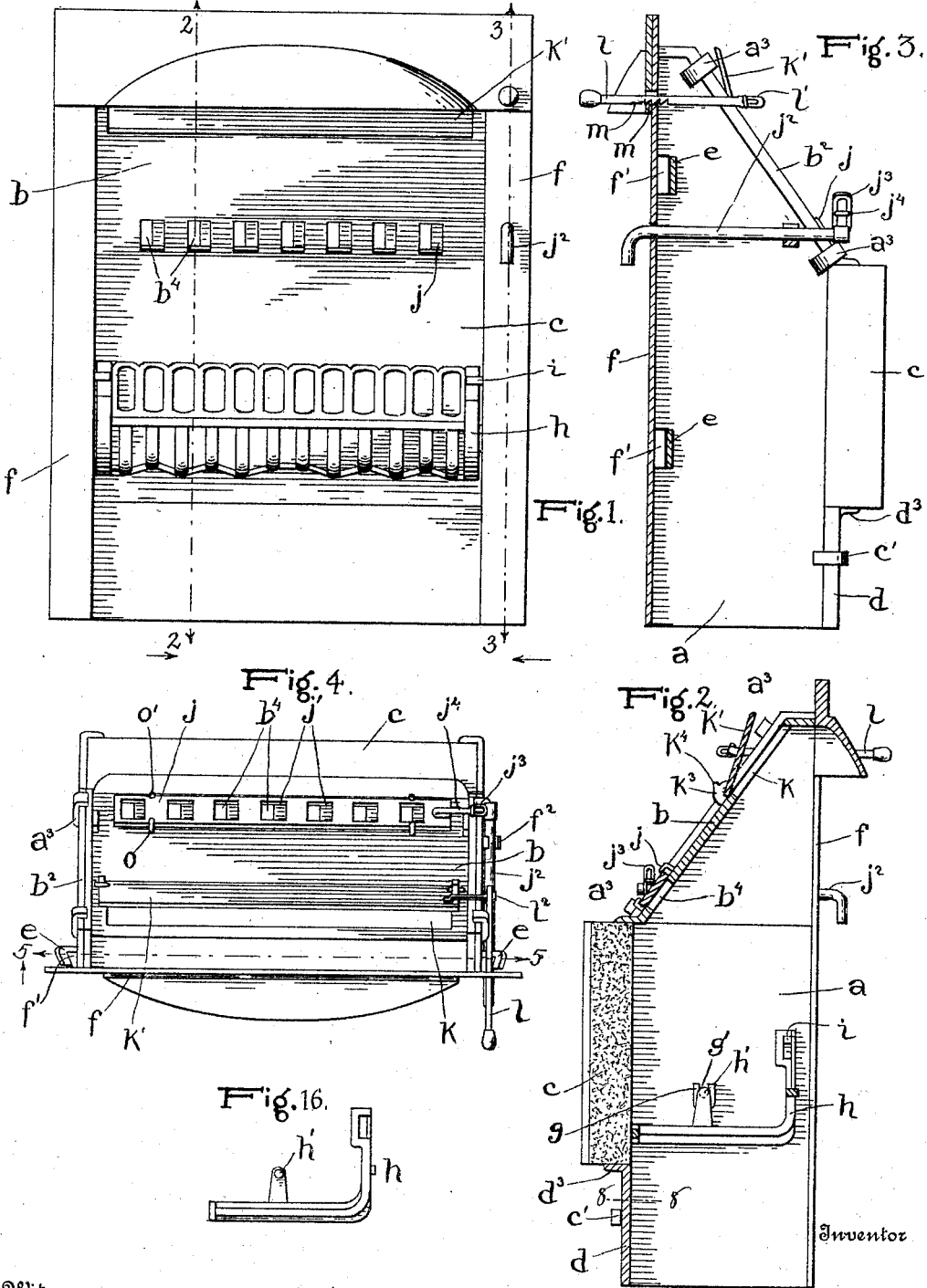

UNITED STATES PATENT OFFICE.

CHARLES F. SALTER, OF KNOXVILLE, TENNESSEE, ASSIGNOR OF ONE-THIRD TO GEORGE E. HELM, OF KNOXVILLE, TENNESSEE, AND ONE-THIRD TO H. C. HELM, OF HARRIMANN, TENNESSEE.

KNOCKDOWN MOUNTED DUMPING-GRATE.

No. 929,713.     Specification of Letters Patent.     Patented Aug. 3, 1909.

Application filed May 28, 1908. Serial No. 435,394.

*To all whom it may concern:*

Be it known that I, CHARLES F. SALTER, a citizen of the United States, resident of Knoxville, in the county of Knox and State of Tennessee, have made a certain new and useful Invention in Knockdown Mounted Dumping-Grates; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a front view of the invention. Fig. 2 is a section on the line 2—2 Fig. 1. Fig. 3 is a section on the line 3—3 Fig. 1. Fig. 4 is a plan view of the invention. Fig. 5 is a section on the line 5—5 Fig. 4. Fig. 6 is a rear view of the invention. Fig. 7 is a plan view of one end portion of the invention, on a larger scale. Fig. 8 is a detail sectional view on the line 8—8 Fig. 2. Fig. 9 is a similar view showing initial position of parts. Fig. 10 is a plan view of the back piece and two side pieces of the invention when put together. Fig. 11 is a detail perspective view of one end portion of the reciprocatory damper. Fig. 12 is a similar view of one end portion of the operating rod therefor. Fig. 13 is a similar view of one end portion of the pivoted damper. Fig. 14 is a detail sectional view taken on the same line as Fig. 2, but on a larger scale. Fig. 15 is a detail side view of the back piece. Fig. 16 is a detail side view of the grate basket. Fig. 17 is a detail perspective view of one of the side frame pieces. Fig. 18 is a similar view of the top piece. Fig. 19 is a detail rear view of the front frame piece.

The invention has relation to grates for open fire-places, having for its object the provision of a grate detachably mounted on trunnions in an inclosing frame or fire place lining and all the parts of which may be conveniently knocked down and packed in small space for shipment etc., and which may be set up or assembled without the use of bolts or screws in a short time by an unskilled workman or boy.

Other objects and advantages will hereinafter appear.

The invention consists in the novel construction and combinations of parts as hereinafter set forth.

In the accompanying drawings, illustrating the invention, the letters $a, a$, designate the two side frame pieces of the grate inclosure or lining of the fire place, having rear vertical slideways $a', a'$, open at the top and forming a seat for the fire back $c$, said frame pieces having inclined upper edges $a^2, a^2$, provided with lugs $a^3, a^3$, forming slideways or seats also open at the top for the inclined top piece $b$; rear lugs $c', c'$, forming means of connection with the back piece $d$, below the fire back; front lugs $e, e$, forming means of connection with the front frame piece $f$; inner lugs $g, g$, having slots $g', g'$, open at the tops thereof for the reception of the trunnions $h', h'$, of the grate $h$; and inner stop lugs $i, i$, adapted for engagement with the grate to maintain it in normal position.

In assembling the parts the back piece $d$, which has lateral forward extending flanges $d', d'$, provided with notches $d^2, d^2$, is first connected with one side frame piece $a$, and then with the other side frame piece, such part $a$, being brought against the back piece in such manner that the rear inward extending lug $c'$, thereof will engage with a notch $d^2$, of a flange $d'$, when by turning the part $a$, outward the lug $c'$, will turn therewith into engagement with the rear of the back piece and the flange $d'$, will be brought against the outer lateral face of the side frame to limit the outward movement thereof, both parts being then at right angles to each other. The fire back $c$, is then dropped into position in the seat or slideways $a', a'$, resting upon a top flange $d^3$, of the back piece and acting to further brace the side frame pieces $a, a$, against outward movement. The inclined top $b$, is then slid downward in the slideways formed by the inward extending lugs $a^3, a^3$, until it abuts at its lower edge against the fire back, said top having lateral grooves $b', b'$, in its under face, having engagement with the upper inclined edges of the side frames, and a narrow horizontal top flange $b^2$, also grooved laterally on its under face in continuation of the grooves $b', b'$, and acting to limit the downward movement of the top. The side frames are thus additionally secured against outward movement and at the same time braced against inward movement. The frame thus formed is now tilted rearward and the front piece $f$, being brought into position is drawn upward until the wedge-form dove-tail lugs $f', f'$, which project from its inner face are engaged with seats of similar formation in the front lugs $e, e$, of the side frames when, the parts being lowered to the ground, the whole frame is securely locked together so that separation or movement of the parts thereof cannot take place. The front piece when in position in the lining frame abuts against the top piece to prevent upward slidable movement thereof.

The top piece $b$, is provided with a line of openings $b^4$, at the lower portion thereof, such openings being controlled by a reciprocatory damper plate $j$, having a line of similar openings $j'$, and being operated by a horizontal rotatable rod $j^2$, having an arcuate slotted right-angle end-extension $j^3$, having engagement with a lug $j^4$, of the damper plate, said lug having its outer end portion formed with opposite notches $j^5$, $j^5$, which are engaged by the arcuate end $j^3$, of the operating rod, the neck portion $j^6$, of the lug connecting the lug proper with the T-form head $j^7$, thereof fitting in the slot of the end extension $j^3$. Thus upon rotation of the rod $j^2$, the arcuate end extension $j^3$, will bear against the end walls of the notches $j^5$, $j^5$, in the manner of a cam, and will act to force the damper to open or closed position as the case may be. This operating rod has bearings in an outward extending lug $f^2$, of one of the side frame pieces and in a perforation $f^3$, of the front piece.

At the upper portion of the top piece $b$, an opening $k$, extending entirely across the same, is provided, such opening being controlled by a pivoted damper $k'$, having end pivot extensions $k^2$, $k^2$, provided with bearings in lugs $k^3$, $k^3$, of the top piece, one of said lugs $k^3$, having a stop extension $k^4$, against which the damper is designed to rest in entirely open position thereof.

An operating rod $l$, is provided with a slot $l'$, at its rear end portion having engagement with a laterally extending lug $l^2$, of the damper, this lug being provided with opposite notches $l^3$, $l^3$, a T-form head $l^4$, and a neck portion $l^5$, connecting such head with the body of the lug and lying at the bottom of the opposite notches. Upon endwise movement of the rod $l$, an end wall of the slot $l'$, will engage the neck portion $l^5$, of lug $l^2$, to open or close the damper. The damper may be held partly open by means of engagement of rack teeth $m$, of the rod with a tooth $m'$, formed in the bottom of the opening $m^2$, of the front frame piece through which opening the rod passes.

In order to place damper plate $j$, and its operating rod $j^2$, in position, the crooked rod handle is first passed from the rear through the perforation $f^3$, of the front piece and the oppositely notched part $n$, thereof let down into the contracted slot or opening in the top of lug $f^2$, when upon pushing the rod slightly inward the rounded body thereof will come into engagement with the cylindrical bearing perforation of the lug $f^2$, from which such contracted slot leads. The damper plate is then turned so that the lug $j^4$, which is of flattened character will be brought in the same plane as or in register with the slot $j^x$, of the extension $j^3$, when the notched end of the lug may be pushed within said slot, and the damper plate being turned to one side, the opposite notches of the lug will at the same time pass into engagement with the branches $j^y$, of the extension $j^3$, and the neck portion $j^6$, into engagement with the slot $j^x$. The damper plate may be then pressed upward into engagement with lugs $o$, of the top frame piece, and being let fall, will drop into engagement with lugs $o'$, of the top piece without escaping from the downturned ends of the lugs $o$. The damper $k'$, may now be added, and to this end the operating rod $l$, thereof is first pushed through the opening $m^2$, of the front frame piece. The damper is then turned so that the flattened lug $l^2$, thereof will lie in the same plane as or register with the slot $l'$, of the rod, when the notched end of the lug may be pushed within the slot and the damper being turned to one side the opposite notches of the lug will pass into engagement with the rod and the neck portion $l^5$; engage with the slot. The end pivot extension $k^2$, of the damper nearest the lug $k^3$, at one side is then passed by endwise movement into engagement with the perforation of said lug, when the opposite pivot extension $k^2$, is dropped into engagement with the other lug $k^3$. The grate basket $h$, being passed into the fire place is let down in such manner that the pivot studs or trunnions $h'$, at the ends thereof drop into open top slots $g'$, of bearing lugs $g$, of the side frame pieces. The major part of the weight of the grate basket being forward thereof it will drop automatically to normal lowered position when the front part of the grate will lie in engagement with the stop lugs $i$, $i$, of the side frame pieces.

It will be noted that when the parts are assembled, the last piece added to the frame, namely the front frame piece, locks the entire frame together and is held in position by the weight of the castings, rendering it impossible for the parts to become separated after being once set in position.

The grate basket rests on pivots or trunnions carried by upward extending end arms lying above the horizontal grate bars and intermediate of the height of the vertical front bars of the basket, whereby it is balanced to turn upward easily upon its pivots, for dumping purposes, and returns to normal position automatically.

The dampers enable the fire to be quickly started and at the same time perfectly controlled, the upper damper serving as the usual regulator of the heat and draft and the lower damper for fire starting purposes.

All parts of the invention are designed and adapted to be made of cast iron with the exception of the fire back, which is made of fire clay or other suitable refractory material.

Having described the invention, what I claim and desire to secure by Letters Patent is:

1. In a grate for open fire places, a lining frame including separable side pieces having rear vertical guideways open at the top, and inclined upper guideways also open at the top, a separable fire back having slidable movement to position in said rear guideways, a separable inclined top piece having slidable movement to position in said upper guideways and abutting against said fire back to prevent upward slidable movement thereof, and a separable front piece having connection with said side pieces and abutting against said top piece to prevent upward slidable movement thereof.

2. In a grate for open fire places, a lining frame including separable side pieces having inclined upper guideways open at the top, a separable inclined top piece having slidable movement to position in said guideways, and a separable front piece abutting against said top piece to prevent upward slidable movement thereof and having wedge-form dovetail lug connection with said side pieces.

3. In a grate for open fire places, a lining frame including separable side pieces having rear vertical guideways open at the top and inclined upper guideways also open at the top, a separable fire back having slidable movement to position in said rear guideways, a separable inclined top piece having slidable movement to position in said upper guideways, and a separable front piece abutting against said top piece to prevent upward slidable movement thereof and having wedge-form dovetail lug connection with the side pieces.

4. In a grate for open fire places, a lining frame, including separable side pieces having rear vertical guideways and inclined upper guideways, a separable back piece having slot and lug connection with said side pieces, a separable fire back fitting in said rear guideways above said back piece, a separable inclined top piece fitting in said upper guideways, a separable front piece having wedge-form dovetail lug connection with said side pieces, and a grate basket mounted in said frame.

5. In a grate for open fire places, a lining frame including separable side pieces having rear vertical guideways and inclined upper guideways, a separable back piece having slot and lug connection with said side pieces, a top horizontal flange and lateral vertical flanges, a separable fire back fitting in said rear guideways above said back piece, a separable inclined top piece fitting in said upper guideways and having bottom grooves at each side engaging the upper edges of the side pieces, a separable front piece, and a grate basket mounted in said frame.

6. In a grate for open fire places, a lining frame including separable side pieces having rear vertical guideways and inclined upper edges having guideways adjacent thereto, a separable back piece having slot and lug connection with said side pieces, a top horizontal flange and lateral vertical flanges, a separable fire back fitting in said rear guideways, a separable inclined top piece fitting in the upper guideways and having bottom grooves engaging the upper edges of the side pieces, a separable front piece having wedge-form dovetail lug connection with said side pieces, and a grate basket mounted in said frame.

7. In a grate for open fire places, a lining frame, having an inclined top piece provided with a horizontal line of draft openings and a horizontal draft opening, a sliding damper having a line of openings adapted to register with the alined openings of the top piece, said damper having detachable lug connection with the top piece and being provided with an end lug, a rotatable operating rod having a slotted arcuate end extension provided with detachable engagement with said end lug, a pivoted damper for said horizontal draft opening having detachable lug connection with the top piece, and an end lug, and a slidable operating rod for the pivoted damper having an end slot detachably engaging the end lug of the damper.

In testimony whereof I affix my signature, in presence of two witnesses.

CHAS. F. SALTER.

Witnesses:
 G. E. HELM,
 KENNETH HARRIS.